(12) United States Patent
Metrani et al.

(10) Patent No.: US 8,983,300 B1
(45) Date of Patent: Mar. 17, 2015

(54) RECEIVING INFRARED COMMUNICATIONS ON A MOBILE DEVICE

(71) Applicant: Peel Technologies, Inc., Mountain View, CA (US)

(72) Inventors: Samyeer Suresh Metrani, Milpitas, CA (US); Siva Subramanian Muthukumarasamy, Santa Clara, CA (US)

(73) Assignee: Peel Technologies, Inc., Mountain View, CA (US)

( * ) Notice: Subject to any disclaimer, the term of this patent is extended or adjusted under 35 U.S.C. 154(b) by 0 days.

(21) Appl. No.: 14/271,323

(22) Filed: May 6, 2014

Related U.S. Application Data

(60) Provisional application No. 61/936,832, filed on Feb. 6, 2014.

(51) Int. Cl.
*H04B 10/00* (2013.01)
*G08C 23/04* (2006.01)

(52) U.S. Cl.
CPC ...................... *G08C 23/04* (2013.01)
USPC ............ 398/106; 398/118; 398/128; 398/130; 398/135; 398/136; 398/202; 398/208; 340/825.69; 340/825.72; 340/825.22; 455/420; 455/418; 455/603

(58) Field of Classification Search
CPC ............. H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116
USPC ......... 398/106, 118, 119, 127, 128, 130, 135, 398/136, 202, 208, 209, 164, 107; 340/825.69, 825.72, 825.22; 455/418, 455/420, 556.1, 603
See application file for complete search history.

(56) References Cited

U.S. PATENT DOCUMENTS

| | | | |
|---|---|---|---|
| 6,384,737 B1 * | 5/2002 | Hsu et al. | 340/12.23 |
| 7,394,987 B2 * | 7/2008 | Hong et al. | 398/106 |
| 8,712,245 B1 * | 4/2014 | Alao et al. | 398/106 |

* cited by examiner

*Primary Examiner* — Hanh Phan
(74) *Attorney, Agent, or Firm* — Fenwick & West LLP (57) ABSTRACT

A system and a method are disclosed for receiving an infrared signal on a mobile device. The mobile device receives an infrared signal by creating an intermediate bitstream based on the received infrared signal. The intermediate bitstream is trimmed, downsampled, and demodulated in the time domain. The intermediate bitstream is then converted into a raw infrared code. The received bitstream is processed in a software layer, enabling the mobile device to process infrared signals without the use of additional hardware configured on the mobile device.

24 Claims, 10 Drawing Sheets

Standard GPIO

FIG. 7A

SPI

RECEIVING INFRARED COMMUNICATIONS ON A MOBILE DEVICE

CROSS REFERENCE TO RELATED APPLICATIONS

This application claims the benefit of, and priority to, U.S. Provisional Application No. 61/936,832, filed on Feb. 6, 2014, which is incorporated by reference in its entirety.

BACKGROUND

1. Field of Art

The disclosure generally relates to the field of infrared communication and more specifically to an infrared receiver on a computing device.

2. Description of the Related Art

Conventional remote-controlled electronics, such as stereos, televisions, set-top boxes, and DVD players, send and receive information using infrared signals. Typically, a user sends an infrared signal to a device from a remote control paired with the device. For example, a television may receive instructions from a remote control designed for use with that particular television. However, users can now control multiple devices using a single mobile device (e.g., a smartphone or tablet) that acts as a remote control. Current mobile devices require specialized hardware to communicate with remote-controlled devices. However, additional hardware increases the cost of manufacturing mobile devices and increases power consumption within mobile devices.

BRIEF DESCRIPTION OF DRAWINGS

The disclosed embodiments have other advantages and features which will be more readily apparent from the detailed description, the appended claims, and the accompanying figures. A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium that includes instructions for generating and receiving an infrared signal on a computing device. The computing device receives a raw infrared (IR) code. The raw IR code encodes information to be output as an IR signal. The computing device also receives a carrier waveform, which determines an output signal frequency. The computing device generates a processed signal. The processed signal is a bitstream encoding the information in the raw IR code in the time domain. The processed signal is modulated and upsampled so that the processed signal can be output, at the clock speed, as an IR signal without compressing the signal in the time domain. Alternatively, the processed signal may be combined with the clock signal and output on the bus. A bitrate of the bus is set to match the carrier frequency.

The computing device is also capable of receiving an IR signal. The IR signal is converted into an intermediate signal. The intermediate signal is a bitstream in the time domain. The intermediate signal is trimmed, downsampled, and demodulated before being converted into raw IR code. Repeat code segments are then separated from the raw IR code.

Example Computing Machine Architecture

Figure 1:
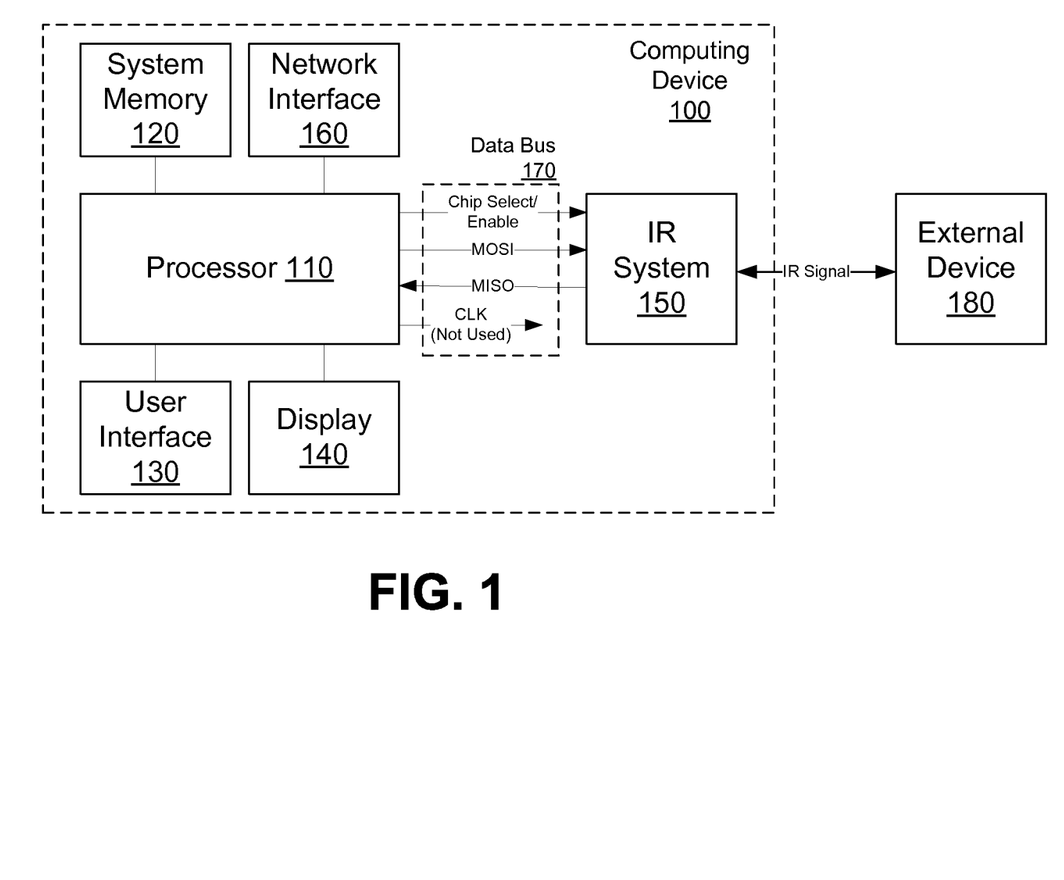
FIG. 1 illustrates a computing device capable of generating an infrared signal, according to one example embodiment.

FIG. 1 is a block diagram of a computing device 100 capable of generating an infrared signal, according to one example embodiment. The computing device 100 may be a personal computer (PC), a tablet, a personal digital assistant (PDA), a smartphone, an electronic device (e.g., a television, a stereo, etc.), or any other machine capable of generating and/or receiving an infrared signal. Furthermore, while only a single computing device 100 is illustrated, the term "computing device" shall also be taken to include any collection of devices that individually or jointly perform any one or more of the methodologies discussed herein.

The example computing device 100 includes one or more processors 110 (e.g., a central processing unit (CPU), a digital signal processor (DSP), one or more application specific integrated circuits (ASICs), or any combination of these) and a system memory 120 (e.g., a hard disk, an optical drive, a solid state drive, or any combination of these). The system memory 120 includes a machine-readable medium storing instructions (e.g., software) or program code embodying any one or more of the methodologies or functions described herein.

Furthermore, the system memory 120 may also include volatile memory. The instructions or program code may also reside, at least partially, within the processor 110 (e.g., within a processor's cache memory) during execution thereof.

While the machine-readable medium is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium that is capable of storing instructions or program code for execution by the machine and that cause the machine to perform any one or more of the methodologies disclosed herein. The term "machine-readable medium" includes, but not be limited to, data repositories in the form of solid-state memories, optical media, and magnetic media.

The instructions may be transmitted over a network via a network interface 160 connected to the processor 110. The network interface 160 operatively connects the computing device 100 to one or more networks. For example, the network interface 160 may connect the computing device 100 to a wired or wireless network using technologies such as Ethernet, 802.11, worldwide interoperability for microwave access (WiMAX), 3G, 4G, Long Term Evolution (LTE), code division multiple access (CDMA), digital subscriber line (DSL), etc. Examples of networking protocols used include multiprotocol label switching (MPLS), transmission control protocol/Internet protocol (TCP/IP), hypertext transport protocol (HTTP), simple mail transfer protocol (SMTP), and file transfer protocol (FTP). In some embodiments, some or all of the data is encrypted using any suitable technique or techniques.

The computer system 100 may further include an input device 130 (e.g., a keyboard, a touchscreen, a keypad, a joystick, etc.) and a display 140 (e.g., a plasma display panel (PDP), a liquid crystal display (LCD), a projector, or a cathode ray tube (CRT)) to receive and output data to a user, respectively. In some embodiments, a single component, such as a touchscreen, may be configured as both an input device 130 and a display 140.

The computing device 100 includes an infrared (IR) system 150. The IR system 150 is a component or set of components capable of generating an IR signal based on data sent to the IR system 150 from the processor 110. The IR signal encodes information in a series of IR flashes emitted from the IR system 150. The IR system 150 includes an IR-emitting diode (IRED) or another component that emits light in the IR or near-IR spectrum. Furthermore, the IR system 150 may be configured to receive IR signals sent to the computing device 100. In one embodiment, the IRED on the IR system 150 is capable of both generating and receiving an IR signal. The IR system 150 also includes a driver circuit to control the output of the IRED. The driver circuit, for example, may be a transistor, an integrated circuit, an I/O pin connected to a microprocessor, or any combination of these that controls current to the IRED.

In some cases, the IR signal generated by the IR system 150 is received by an external device 180. The external device 180 may be an electronic device such as a television, a stereo, a computer, or a home appliance. Examples of a home appliance include a heater, a fan, a thermostat, a garage door, or an air conditioner. The external device 180 can be any other applicable device that receives commands via IR signals. For example, the external device 180 may be a set-top box, a digital video recorder (DVR), a video player (including but not limited to a Blu-ray player, a DVD player, a VCR player, and the like), a gaming console, a digital media player (including but not limited to an APPLE TV, a ROKU BOX, and the like), or a sound system. These example embodiments of an external device 180 may be connected to a television or implemented as standalone devices. Additionally or alternatively, the IR system 150 may be configured to receive an IR signal generated by one or more external devices 180 or transmit an IR signal to one or more external devices 180. For example, the computing device 100 communicates with a television via IR signals to adjust the volume of the television, but may communicate with a set-top box via IR signals to select the channel playing on the television.

One or more buses 170 connect one or more components of the computing device 100. In one embodiment, the bus 170 connecting the processor 110 and the IR system 150 may include an I²S bus or an SPI bus. However, the bus 170 used to connect the components of the computing device 100 may be of any applicable type or model. Furthermore, the processor 110 and the IR system 150 may communicate in a master/slave mode, in which the IR system 150 is slaved to the processor 110 via the bus 170. Therefore, the bus 170 connecting the processor 110 and the IR system 150 may include multiple logic signals for linking the two components in a master/slave relationship, including a Chip Select/Enable, a Master-Out/Slave-In line (MOSI, which carries data from the processor 110 to the IR system 150), a Master-In/Slave-Out line (MISO, which carries data to the processor 110 from the IR system 150), and a clock (CLK) signal. However, some buses 170 may feature additional or alternative logic signals.

In one example embodiment, the processed signal is sent from the processor 110 to the IR system 150 over the MOSI signal. Furthermore, any received signals may be sent over the MISO signal to the processor 110 from the IR system 150. The Chip Select/Enable signal may power the IR system 150 such that the IR system 150 is only active when the Chip Select/Enable signal is output. Other variations of the bus 170 may have different logic signals linking the two components. A clock speed also is associated with the bus 170. The clock speed regulates the rate ("bitrate") at which information is sent on the bus 170. Some embodiments of the bus 170 may feature adjustable clock speeds. The bitrate of the bus 170 may be set to a predetermined value or alternatively can be set to an arbitrary value.

Figure 2:
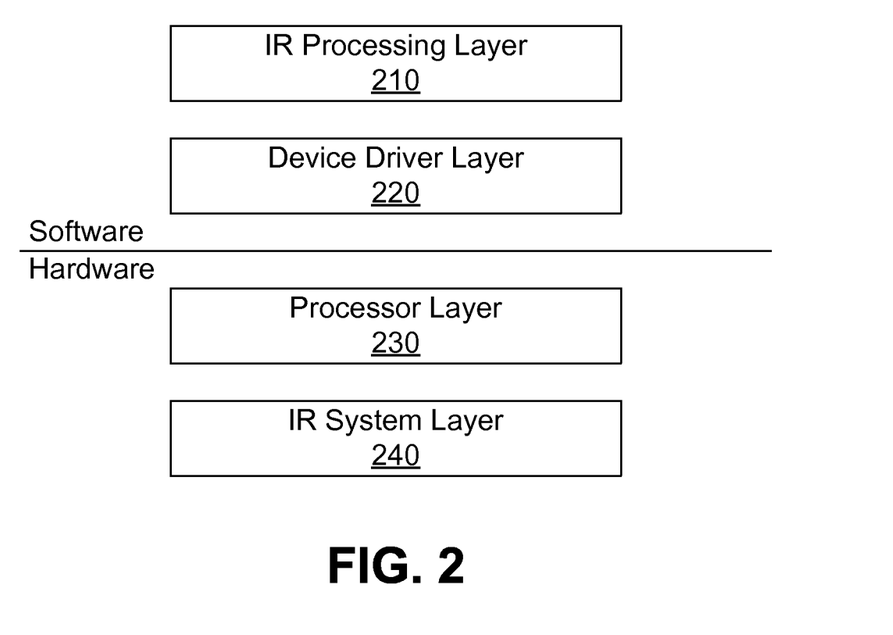
FIG. 2 illustrates a system architecture for the computing device, according to one example embodiment.

Referring now to FIG. 2, it is a block diagram of a system architecture for the computing device 100, according to one example embodiment. The system architecture illustrates both hardware and software architecture layers necessary for generating an infrared signal on a computing device. The system architecture includes an IR processing layer 210 and a device driver layer 220, both embodied as software stored on the computing device 100. The system architecture also includes layers representing the processor 110 and the IR system 150 configured on the computing device 100. In this example environment, both the processor 110 and IR system 150 are embodied as hardware. Alternative embodiments of the system architecture may include additional or alternative layers.

The IR processing layer 210 includes program code (or instructions) for generating a signal for output to the IR system 150, as well as program code for processing signals received by the IR system 150. The program code in the IR processing layer 210 may be embodied as an application, a library, a portion of an operating system, or any other apparent software program.

Information stored on the computing device 100 may be sent to the IR processing layer 210 for output to the IR system 150. The information, for example, may be an instruction or other data to be transmitted from the computing device 100 via an infrared signal. However, the information may need to be decoded or processed (e.g., modulated, upsampled, transcoded, etc.) before the information is in a format that the IR system 150 can output. A signal based on the information is generated in the IR processing layer 210. The signal can be directly output by the IR system 150 in one example environment. By generating and processing the signal in the IR processing layer 210, the computing device 100 does not require external hardware (e.g., FPGAs, AISCs, etc.) that would otherwise decode or process the IR signal. Furthermore, incoming IR signals are also processed in the IR processing layer 210 into a format that can be output to the processor 110 so that the IR system 150 does not have to further process the intermediate signal.

One or more device drivers facilitate communication between the bus 170 and one or more components of the computing device 100 in the device driver layer 220. The device drivers may include software for receiving information via the bus 170 and relaying the information to a component associated with the device driver. For example, a device driver associated with the IR system 150 may receive a signal from the software in the IR processing layer 210 via the bus 170 and send the signal to the IR system 150, which outputs the signal as an IR signal. The device driver may also output information encoded in a signal from a component associated with the device driver (e.g., the IR system 150) to the bus 170. Each component configured on the computing device 100 may be associated with a different device driver 220.

Instructions on the computing device 100 are executed in the processor layer 230. The processing layer 230 includes the processor 110, which executes instructions received through the data bus 170. IR signals are output and received in the IR system layer 240. The IR system layer 240 includes the IR system 150 and other hardware for facilitating IR communication.

Example Process for Generating an Infrared Signal

Figure 3:
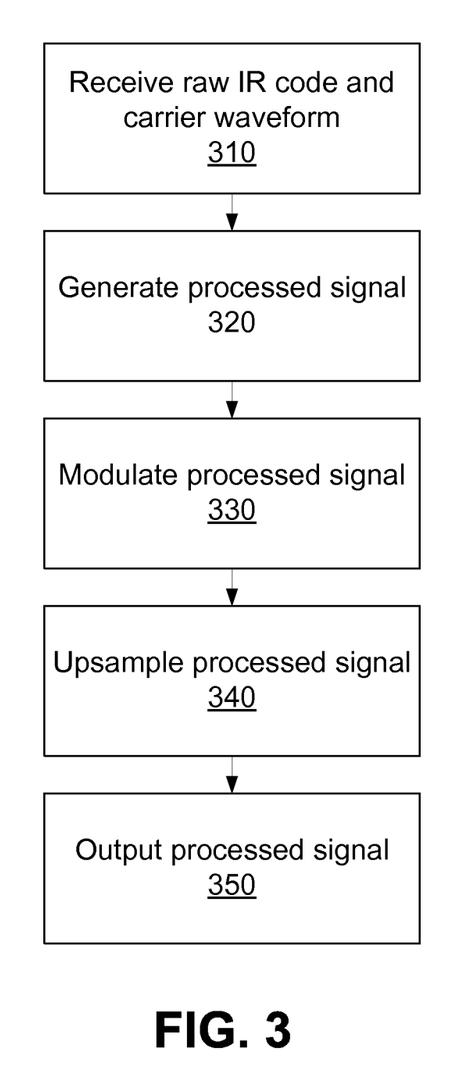
FIG. 3 illustrates a process for generating an infrared signal on a computing device with a fixed clock speed, according to one example embodiment.

Referring to FIG. 3, it illustrates a process for generating an infrared signal on a computing device with a fixed clock speed, according to one example embodiment. The process of FIG. 3 is enabled at least in part by software executing on the computing device 100. For example, the computing device 100 may comprise instructions stored to a non-transitory computer-readable storage medium that when executed by the processor 110, cause the processor 110 to perform the steps of FIG. 3 below. Additional or alternative steps may be included in other embodiments of the process of FIG. 3.

Raw IR code is received 310 by the computing device 100. The raw IR code encodes information to be output as an IR signal. The raw IR code may be received 310 from an external location, such as from a server connected to a network accessible by the computing device 100, or from a location within the computing device 100. For example, the raw IR code may be retrieved from a data buffer on the system memory 120 or from a cache on the processor 110. The raw IR code may encode the information in a mark/space format. The mark/space format includes a string of numbers. Each number in the raw IR code represents a number of counts during which the IR system 150 is "on" (i.e., emitting an IR signal, logic high, or "1") or "off" (i.e., not emitting an IR signal, logic low, or "0"). The count is the shortest interval during which the IR signal can be emitted. In one embodiment, numbers that represent counts during which the IR system 150 is in an ON state (e.g., logic high or logic '1') are located at odd indexes in the raw IR code. Numbers that represent counts during which the IR system 150 is in an OFF state (e.g., logic low or logic '0') are located at even indexes in the raw IR code.

The computing device 100 also receives a carrier waveform in addition to the raw IR code. The computing device determines a carrier frequency based on the carrier waveform. The carrier frequency is a frequency of the carrier waveform and determines the duration of each count. For example, a carrier frequency of 38 kHz defines the duration of the count as 26.3 microseconds (μs). The computing device can determine the carrier frequency based on an analysis of the carrier waveform. The analysis can be any conventional digital signal processing algorithm. The analysis can be performed by the computing device. Instead of determining the carrier frequency from a carrier waveform, the carrier frequency may be specified by one or more infrared communications protocols, such as the Infrared Data Association (IrDA), Consumer IR (CIR), NEC, RC-5, or other applicable infrared communications protocols. For example, one or more infrared communications protocols may specify a carrier frequency of 38 kHz, while other communications protocols may specify a carrier frequency of 56 kHz. However, the carrier frequency may be any value. The computing device 100 may be capable of outputting IR signals at different carrier frequencies.

The computing device 100 generates 320 a processed signal. The processed signal is a bitstream based on the raw IR code. Each bit of the processed signal corresponds to a count of the raw IR code during which the IR system 150 is in an ON state or an OFF state. For example, a 1 represents a count during which the IR system is in an ON state, while a 0 represents a count during which the IR system is in an OFF state.

The computing device 100 generates 320 the processed signal by determining the value and index (i.e., position in the string) of each number in the raw IR code. The computing device 100 generates a plurality of bits for each number of the raw IR code. The number of bits is determined by the value of the number. For example, a "5" in the raw IR code is represented in the processed signal as five bits. The value of each bit is determined by the index of the number. For example, each bit in the processed signal representing a number at an odd index in the raw IR code is embodied as a 1. Likewise, each bit in the processed signal representing a number at an even index in the raw IR code is embodied as a 0. Each plurality of bits is inserted into the processed signal at the index of the corresponding number in the raw IR code. The bitrate of the processed frequency is based on the carrier frequency. For example, a carrier frequency of 38 kHz results in a bitrate of 38 kilobits per second.

The computing device 100 modulates 330 the processed signal. Since the IR system 150 outputs the IR signal as a series of pulses, the processed signal needs to be modulated 330 into the series of pulses before the processed signal can be output by the IR system 150. The processed signal is modulated 330 using pulse-amplitude modulation. Each pulse corresponds to a count during which the IR system 150 is in an on state.

In some cases, the computing device 100 does not modulate 330 the processed signal. For example, the television system may be able to communicate using an infrared communications protocol in which the output IR signal is unmodulated. In this example, the IR signal may comprise a series of infrared pulses of varying lengths instead of a series of infrared pulses of uniform lengths. The computing device 100 is able to form the output signal without modulating 330 the signal. In another example embodiment, the received 310 infrared code is already modulated. Since the infrared code is modulated, the computing device 100 may output a modulated signal without having to modulate 330 the signal.

The computing device 100 modulates 330 the processed signal by appending a 0 after each bit in the processed signal. Effectively, each 1 in the processed signal is replaced by "10" and each 0 in the processed signal is replaced by "00." Thus, each pulse is represented by "10" in the modulated processed signal. The computing device 100 doubles the bitrate of the processed signal so that both bits, and thus the entire pulse, are output during one count. This allows the pulses to be output at the carrier frequency. Since each pulse includes a single 1 (during which the IR system 150 is on) and a single 0 (during which the IR system 150 is off), the duty cycle of the pulse is 50%. The duty cycle may be changed by appending additional bits to each bit in the processed signal, since different infrared communications protocols may specify different duty cycles.

The computing device 100 upsamples 340 the processed signal. In some embodiments, the bitrate of the processed signal is lower than the bitrate of the bus 170 the processed signal is output on. Since the processed signal is encoded in the time domain, outputting the processed signal at a faster bitrate may compress the processed signal in the time domain. Upsampling 340 allows the computing device 100 to transmit the processed signal at the operating frequency of the bus 170, also known as the bus bitrate, without compressing the signal in the time domain. The bus bitrate is the rate at which data is transmitted on the bus 170.

To upsample 340 the processed signal, the computing device 100 determines the bus bitrate. Based on the difference between the processed signal's bitrate and the bus bitrate, the computing device 100 determines a number of replicated bits to append to each bit in the modulated signal. The number of replicated bits is chosen such that the replicated bits, output at the bus bitrate, will be output over the same time interval as the single bit of the processed signal at the processed signal's bitrate. The number of replicated bits is one less than the quotient of the bus bitrate and the processed signal's bit rate. For example, if the processed signal bitrate, after modulation 330, is 76 kHz and the bus clock speed is 1.5 MHz, the computing device 100 determines that nineteen bits are appended to each bit in the processed signal.

The value of the plurality of replicated bits is based on the value of the bit being replicated. For example, one or more 1's are appended to each 1, and one or more 0's are appended to each 0. The computing device 100 appends the number of replicated bits to the first bit in the modulated signal, wherein the value of the first bit is the same as the value of each of the replicated bits. This process is repeated for each bit in the processed signal.

The computing device 100 outputs 350 the processed signal to the IR system 150. The processed signal is sent to the IR system 150 on the bus 170. Each bit of the processed signal is output at the bus bitrate. The processed signal is sent over the MOSI logic signal. Since the processed signal encodes the intended output for the IR system 150 in the time domain, the IR system 150 bitwise outputs the processed signal to the IRED on the IR system 150, such that the IR system 150 does not perform any further signal processing on the processed signal.

Figure 5:
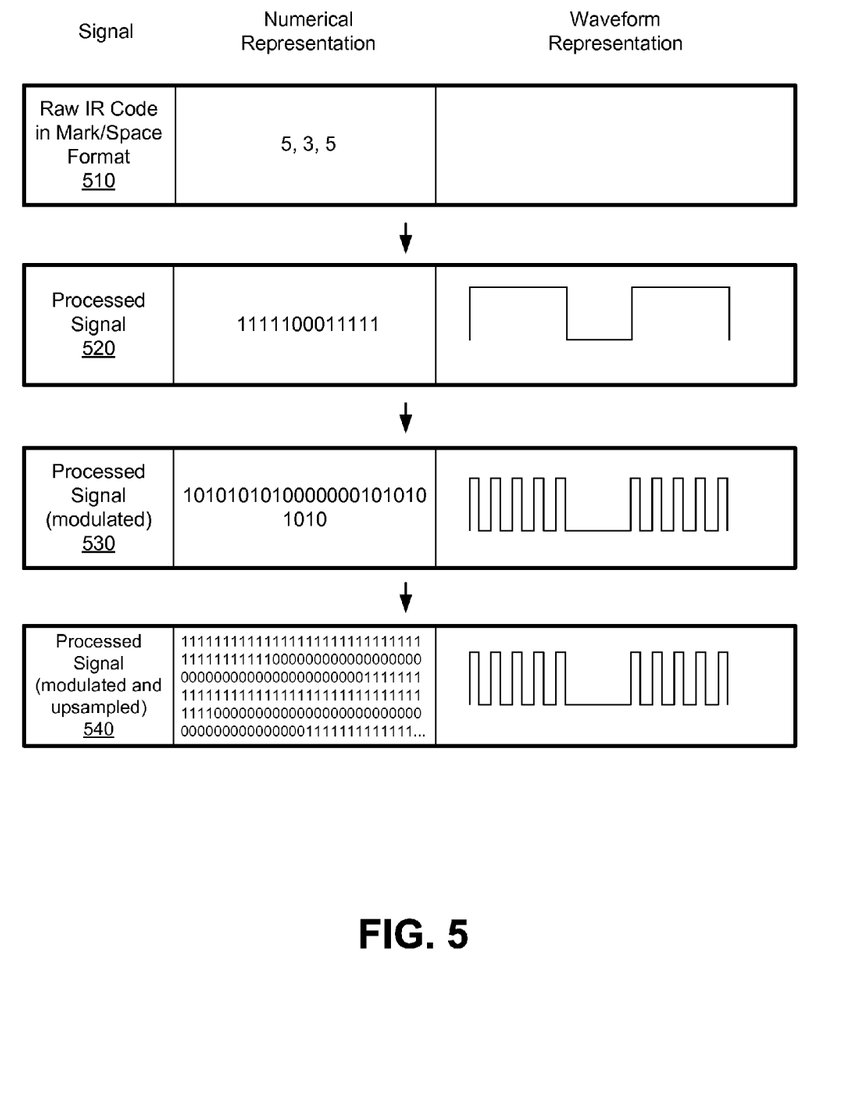
FIG. 5 illustrates a set of example signals on the computing device with the fixed clock speed for generating an infrared signal, according to one example embodiment.

Next, referring first to FIG. 5, it illustrates a set of example signals by the method of FIG. 3, according to one example embodiment. Each signal is illustrated numerically (as a bitstream) and graphically (as a waveform) in FIG. 5. Some signals may only be embodied as a bitstream or a waveform, and not both, in the method of FIG. 3. The signals in FIG. 3 do not encode actual data generated by the computing device 100 and should be considered for explanatory purposes only.

The raw IR code 510 is initially received 310 by the computing device 100. The raw IR code 510 indicates a series of counts, during which the IR system 150 is in an ON state or OFF state. For example, the exemplary raw IR code shown in FIG. 5 indicates that the IR system 150 should be in an ON state for 5 counts, OFF state for 3 counts, and ON state for 5 counts.

The processed signal 520 is the binary bitstream based on the raw IR code. The exemplary processed signal 520 comprises five 1's three 0's, and five 1's which correspond to the elements of the raw IR code 510. Alternatively, the processed signal may be represented as a digital waveform in the time domain. The processed signal is generated 320 in the method of FIG. 3.

The modulated processed signal 530 is the binary bitstream of the processed signal 520 with a 0 appended after each bit in the bitstream of the processed signal. Each 1 in the processed signal is effectively replaced with '10,' while each 0 in the processed signal is replaced with '00.' The modulated processed signal 530 may additionally or alternatively be represented as a series of pulses. Each pulse in the waveform corresponds to a count during which the IR system 150 emits the IR signal. The modulated processed signal 530 is the result of step 330 in the method of FIG. 3.

The upsampled processed signal 540 is an upsampled bitstream based on the modulated processed signal 530. The upsampled processed signal is the result of step 340 in the method of FIG. 3. Each bit in the modulated processed signal 530 is replicated a number of times, wherein the number of replicated bits depends on the difference between the bus bitrate and the bitrate of the modulated processed signal 530. In this example, nineteen replicated bits are appended to each bit in the modulated processed signal 530. The bit steam of the upsampled processed signal 540 is output at the bus bitrate and output to the IR system 150.

Figure 4:
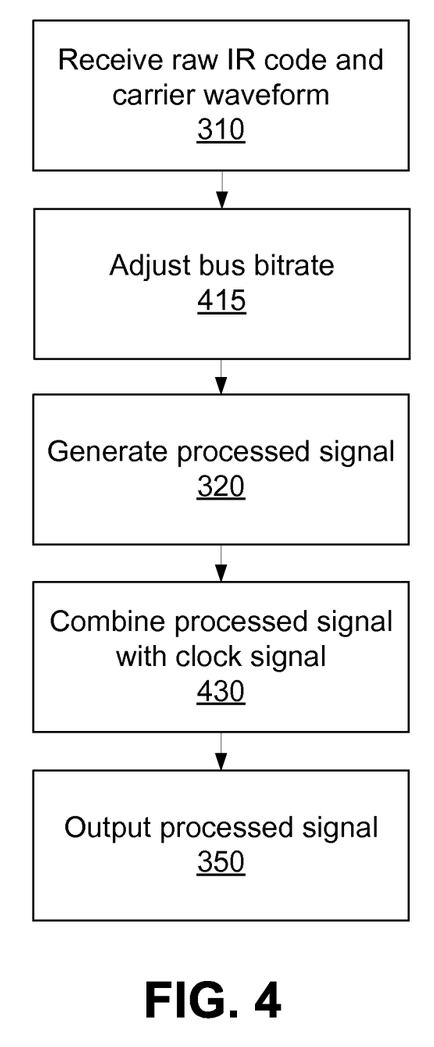
FIG. 4 illustrates a process for generating an infrared signal on a computing device with an adjustable clock speed, according to one example embodiment.

Referring now to FIG. 4, it is a flowchart illustrating a process for generating an infrared signal on a computing device with an adjustable clock speed, according to one example embodiment. While the method of FIG. 4 and the method of FIG. 3 are variations of the same method, the clock speed of the bus 170 can be adjusted on the computing device 100 used in conjunction with the method of FIG. 4. Thus, the method of FIG. 4 does not require the processed signal to be upsampled 340. In one embodiment, the process of FIG. 4 is enabled at least in part by software in the IR processing layer 210 executing on the computing device 100. For example, the computing device 100 may comprise instructions stored to a non-transitory computer-readable storage medium that when executed by the processor 110, causes the processor 110 to perform the steps of FIG. 4 below. Additional or alternative steps may be included in other embodiments of the process of FIG. 4.

The computing device 100 sets 415 the bus clock speed to match the carrier frequency determined by the computing device 100. By setting the bus clock speed at the carrier frequency, the bus bitrate matches the processed signal bitrate. Thus, the processed signal can be output on the bus 170 at the processed signal frequency, without having to upsample 340 the processed signal. Furthermore, setting 415 the bus clock speed changes the frequency of a clock signal on the computing device 100. The clock signal is a digital pulse train, wherein one pulse is emitted per clock cycle. In this example embodiment, each pulse has a 50% duty cycle.

The computing device 100 combines 430 the processed signal with the clock signal. The processed signal is combined 430 with the clock signal by performing a logic AND of the clock signal and the processed signal. This step effectively modulates 330 the signal. The combined processed signal is a series of pulses that correspond to time intervals during which the IR system 150 is emitting an IR signal.

The computing device 100 outputs 350 the processed signal to the IR system 150. The processed signal is output 350 to the bus 170 at the bus bitrate. In one embodiment, the processed signal is output 350 to the MOSI logic signal on the bus 170. Since the bus bitrate has been set 415 to match the processed signal bitrate, the processed signal does not have to be upsampled 340 before being output to the bus 170. The IR system 150 receives the processed signal and outputs the processed signal as the IR signal.

Figure 6:
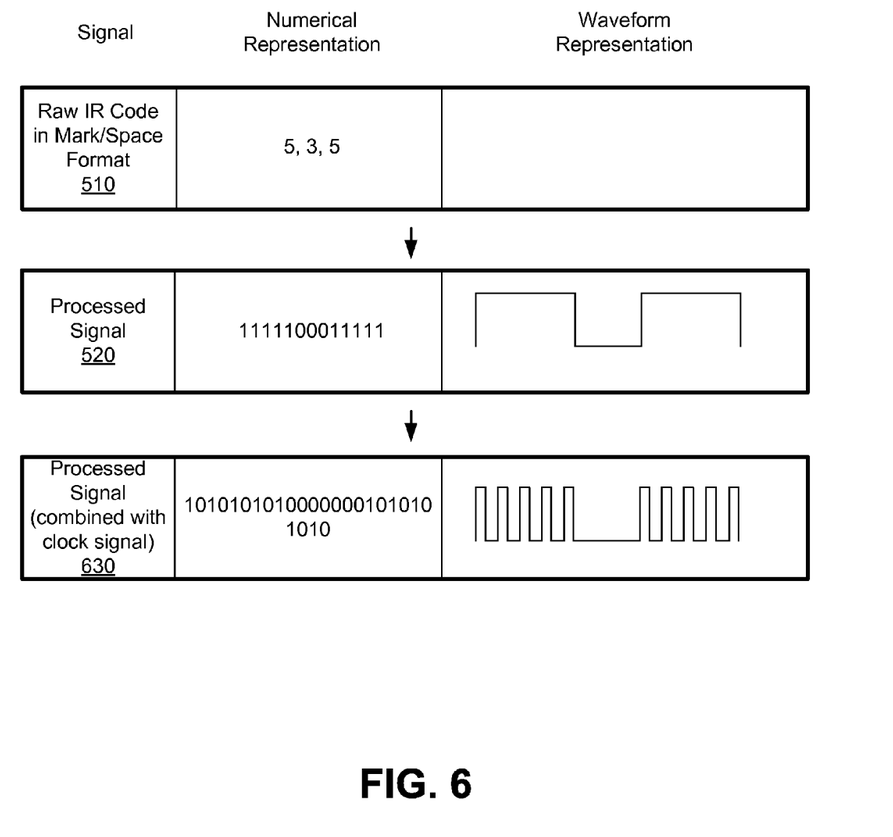
FIG. 6 illustrates a set of example signals on the computing device with the adjustable clock speed for generating an infrared signal, according to one example embodiment.

Referring now to FIG. 6, it illustrates a set of example signals by the method of FIG. 4, according to one example embodiment. Each signal is illustrated numerically (as a bitstream) and graphically (as a waveform) in FIG. 6. Some signals may only be embodied as a bitstream or a waveform, and not both, in the method of FIG. 4. The signals in FIG. 4 do not encode actual data generated by the computing device 100 and should be considered for explanatory purposes only.

The combined processed signal 630 is a bitstream resulting from the combination 430 of the processed signal and the clock signal. The combined processed signal 630 may resemble the modulated processed signal 530, because combining 430 the processed signal with the clock signal effectively modulates 330 the processed signal.

Figure 7A:
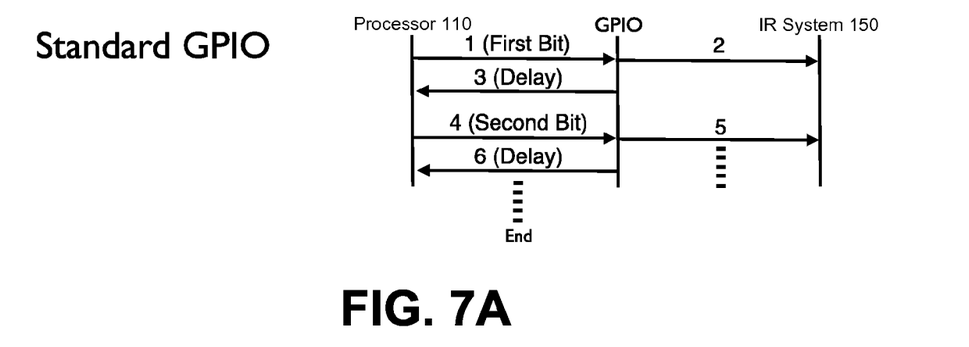
FIG. 7A illustrates sending an infrared signal from a processor to an infrared system using a conventional general-purpose input-output (GPIO), according to one example embodiment.

FIG. 7A illustrates sending an infrared signal from a processor to an infrared system using a conventional general-purpose input-output (GPIO), according to one example embodiment. The GPIO acts as the bus 170 in a conventional computing device 100 supporting IR functionality. A signal is sent to the IR system 150 from the processor 110 as a series of bits spaced with delays. However, the processor 110 may not be able to accurately generate microsecond-scale delays, causing incorrect IR signals to be output.

Figure 7B:
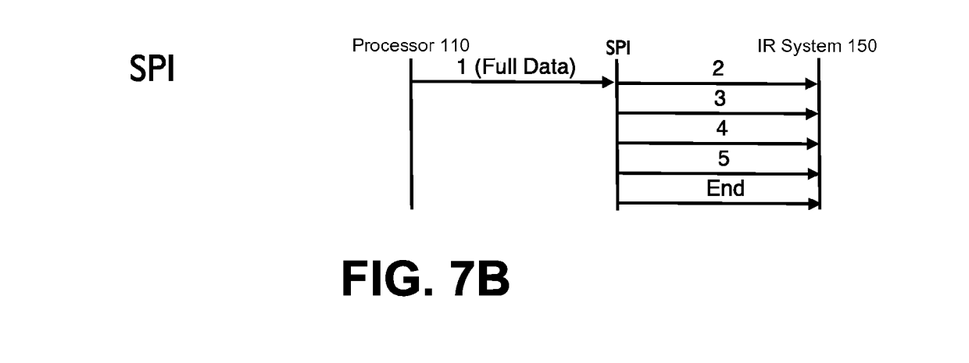
FIG. 7B illustrates sending an infrared signal from a processor to an infrared system using a serial peripheral interface (SPI), according to one example embodiment.

FIG. 7B illustrates sending an infrared signal from the processor 110 to an infrared system 150 using a serial peripheral interface (SPI), according to one example embodiment. The SPI is the bus 170 in one example embodiment. The SPI bus 170 allows the processor 110 to send the entire signal to the IR system 150 at once, without having to generate delays. By sending the entire signal at once, the processor 110 is free to execute other instructions while the IR system 150 outputs the signal.

Example Method for Receiving an Infrared Signal

Figure 8:
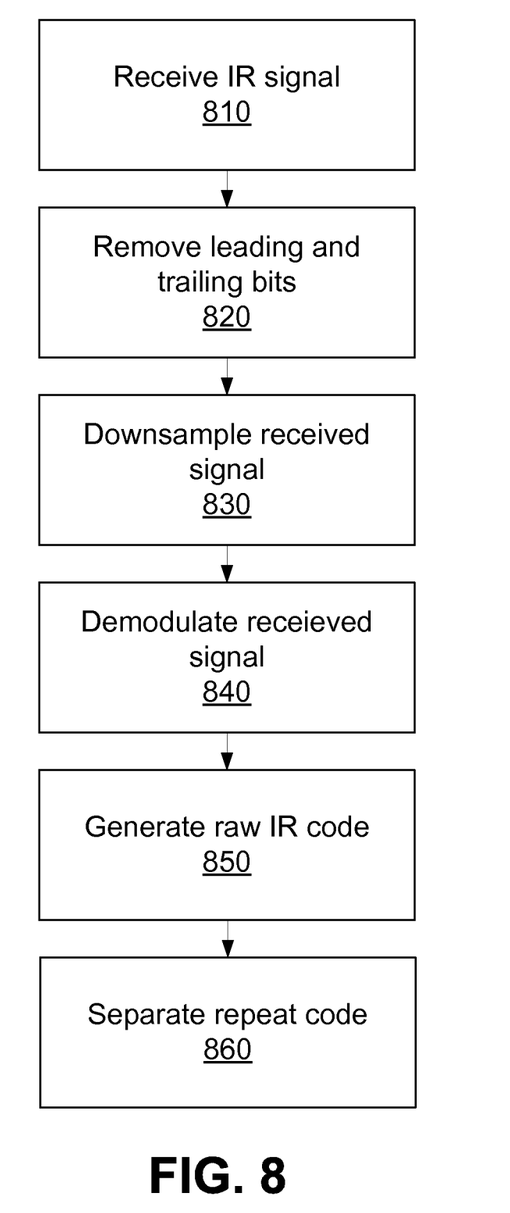
FIG. 8 illustrates a process for receiving an infrared signal on a computing device with a fixed clock speed, according to one embodiment.

Referring now to FIG. 8, it is a flowchart illustrating a process for receiving an infrared signal on a computing device with a fixed clock speed, according to one embodiment. In one embodiment, the process of FIG. 8 is enabled at least in part by software in the IR processing layer 210 executing on the computing device 100. Additional or alternative steps may be included in other embodiments of the process of FIG. 8.

The computing device 100 receives 810 the IR signal. The IR signal is typically sent from an external device 180, such as a remote control, to the IR system 150. This allows the computing device 100 to receive IR codes from the remote control. The computing device 100 may record and use the IR codes, allowing the computing device 100 to act as a remote control that emits the IR codes. In another embodiment, the computing device 100 executes instructions received through infrared signals. However, the IR signal may be received 810 from any apparent source. To receive 810 the IR signal, the computing device 100 sends an empty bitstream, comprised entirely of logic 0's, to the IR system 150. The empty bitstream is sent on the MOSI logic signal, on the bus 170. The empty bitstream may be long enough to span several seconds in the time domain (much longer than the time duration of the IR signal itself), because there may be a delay between when the IR system 150 receives the empty bitstream and when the IR signal is actually received 810. The empty bitstream is written to the SPI bus. When the empty bitstream is written to the SPI bus, the SPI bus generates a clock signal. The clock signal is generated at an operating frequency of the data bus.

The computing device 100 generates 815 an intermediate signal. The generated intermediate signal is a bitstream that encodes the received IR signal. The intermediate signal is received by the processor 110 over the MISO logic signal on the bus 170. The intermediate signal is received by the processor 110 at the operating frequency of the data bus, i.e., the same frequency as the clock signal.

The computing device 100 removes 820 leading and trailing bits from the intermediate signal. The leading and trailing bits are bits that are not overwritten by the IR system 150 when the IR system writes the transcoded IR signal to the empty bitstream. Thus, the leading and trailing bits do not encode the IR signal and are removed from the intermediate signal.

The computing device 100 removes 820 leading bits from the intermediate signal by determining the value of the first bit in the intermediate signal. If the bit is a logic 0, the bit is removed from the intermediate signal. This process is repeated for subsequent bits in the intermediate signal until the computing device 100 detects a logic 1 in the intermediate signal. The first logic 1 in the intermediate signal is considered the start of the intermediate signal. However, any predetermined sequence of logic bits may designate the start of the intermediate signal. The trailing bits are removed 820 from the intermediate signal in the same manner. The computing device 100 determines the value of the last bit in the intermediate signal. If the bit is a logic 0, the bit is removed from the intermediate signal. The computing device 100 removes the last bit in the signal until the value of the last bit in the intermediate signal is a logic 1. In this example embodiment, the logic 1 designates the end of the intermediate signal. However, any predetermined sequence of logic bits may designate the end of the intermediate signal.

The computing device 100 downsamples 830 the intermediate signal. Because the IR signal is sampled at a rate higher than the frequency of the IR signal, the intermediate signal needs to be downsampled so the frequency of the intermediate signal matches the frequency of the IR signal.

To downsample 830 the intermediate signal, the computing device 100 determines a downsampling factor for the intermediate signal. The downsampling factor indicates a number of duplicate bits that are removed when the intermediate signal is downsampled. The downsampling factor is based on the clock speed and the carrier frequency associated with the received carrier waveform. For example, the downsampling factor may be one less than the quotient of the clock speed and the doubled carrier frequency. For example, if the clock speed is 1.5 MHz and the carrier frequency is 38 kHz, the downsampling factor is nineteen. In another embodiment, the computing device 100 uses statistical processing or a machine learning algorithm to determine the downsampling factor. The intermediate signal is downsampled based on the downsampling factor. This process is essentially the reverse of the upsampling step 340.

The computing device 100 demodulates 840 the intermediate signal. Each instance of "10" in the received code is replaced with a logic 1. In one embodiment, the "10" is two consecutive bits—a logic 1 (or high) followed by a logic 0 (or low). Each instance of "00" in the intermediate signal is replaced with a logic 0. In one example, "00" is two consecutive logic 0 (or low) bits, and is replaced by single logic 0 (or low). In another embodiment, the computing device 100 removes alternating bits from the signal. For example, the computing device 100 may remove all bits at odd indices in the intermediate signal. The demodulating step 840 is essentially the reverse of the modulating step 330. In cases in which the computing device 100 received 810 an unmodulated signal, the computing device 810 skips the demodulation 840 step.

The computing device 100 generates raw IR code 850. The raw IR code is based on the demodulated 840 intermediate signal. The computing device 100 generates the raw IR code by generating a number in the raw IR code for each plurality of similar bits in the intermediate signal. The value and position of the number are determined by the corresponding plurality of similar bits in the intermediate signal. The value of each bit is determined by number of bits in the plurality of bits. For example, every string of logic 1's in the intermediate signal is converted into a number in an odd index, and every string of logic 0's in the intermediate signal is converted into a number in an even index. This is the reverse of generating 320 the processed signal.

The computing device 100 separates 860 repeat code in the raw IR code. The IR signal may contain repeated instances of the raw IR code, so duplicates of the raw IR code may need to be separated 860. In some embodiments, the repeat code is separated 860 and stored in a database. This may be accomplished using a duplicate detection formula, a statistical formula, a hash table, an algorithm, or any other method familiar to a person who has ordinary skill in the art.

Figure 9:
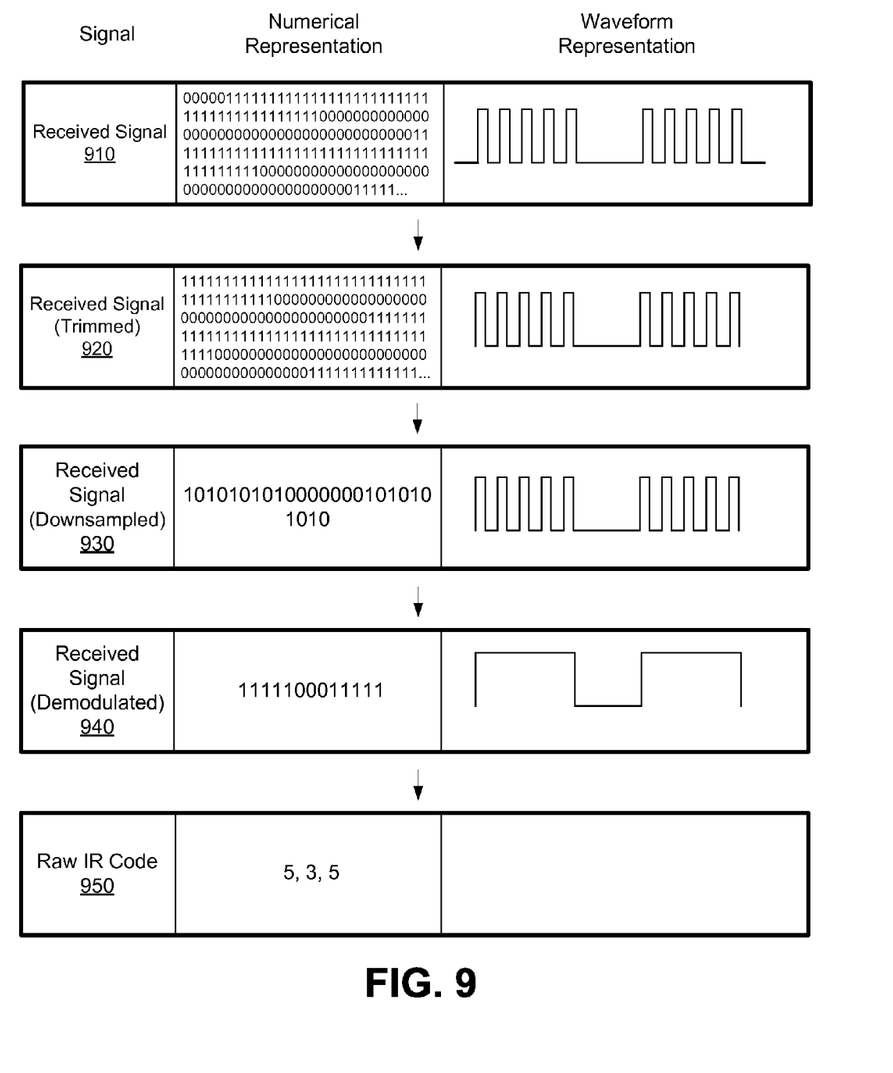
FIG. 9 illustrates a set of example signals on the computing device for receiving an infrared signal, according to one example embodiment.

Referring to FIG. 9, it illustrates a set of example signals on the computing device for receiving an infrared signal, according to one example embodiment. Each signal is illustrated numerically (as a bitstream) and graphically (as a waveform) in FIG. 9. Some signals may only be embodied as a bitstream or a waveform, and not both, in the method of FIG. 8. The signals in FIG. 8 do not encode actual data generated by the computing device 100 and should be considered for explanatory purposes only.

The intermediate signal 910 is generated when the IR system 150 receives 810 the IR signal. In this example, the intermediate signal encodes the raw IR code "5, 3, 5." The IR signal is received for five counts, not received for three counts, and received for five additional counts. However, the intermediate signal 910 also includes several leading bits, represented by five logic 0's. The number of bits corresponds to the time from when the computing device 100 starts sending the empty bitstream to the IR system 150 and when the IR system 150 starts receiving 810 the IR signal.

The trimmed intermediate signal 920 is identical to the intermediate signal 910, sans the leading and trailing bits. The trimmed intermediate signal 920 results from step 820 in the method of FIG. 8.

The downsampled intermediate signal 930 is the downsampled bitstream based on the trimmed intermediate signal 920. Bits are removed from the trimmed intermediate signal 920 based on the downsampling factor. In this example, the downsampling factor is nineteen, so nineteen bits are removed from each string of unbroken logic 1's or logic 0's. The downsampled intermediate signal 930 is the result of step 830 in the method of FIG. 8.

The demodulated intermediate signal 940 is the demodulated bitstream based on the downsampled intermediate signal 930. The demodulation step 840 effectively replaces each instance of "10" (logic 1 followed by logic 0) with a logic 1, and each instance of "00" (logic 0 in succession) with a logic 0.

The demodulated intermediate signal 940 is converted into raw IR code 950. Each string of unbroken logic 1's is converted into a number in an odd index of the raw IR code 950. For example, the leading string of logic 1's in the example demodulated intermediate signal 940 is converted into a "5," wherein the element is at the first index of the raw IR code 950. Each string of unbroken 0's is converted into a number at an even index in the raw IR code. Thus, the string of three 0's is converted into a "3" at the second index of the raw IR code 950.

Example System for Generating and Receiving Infrared Signals

Figure 10:
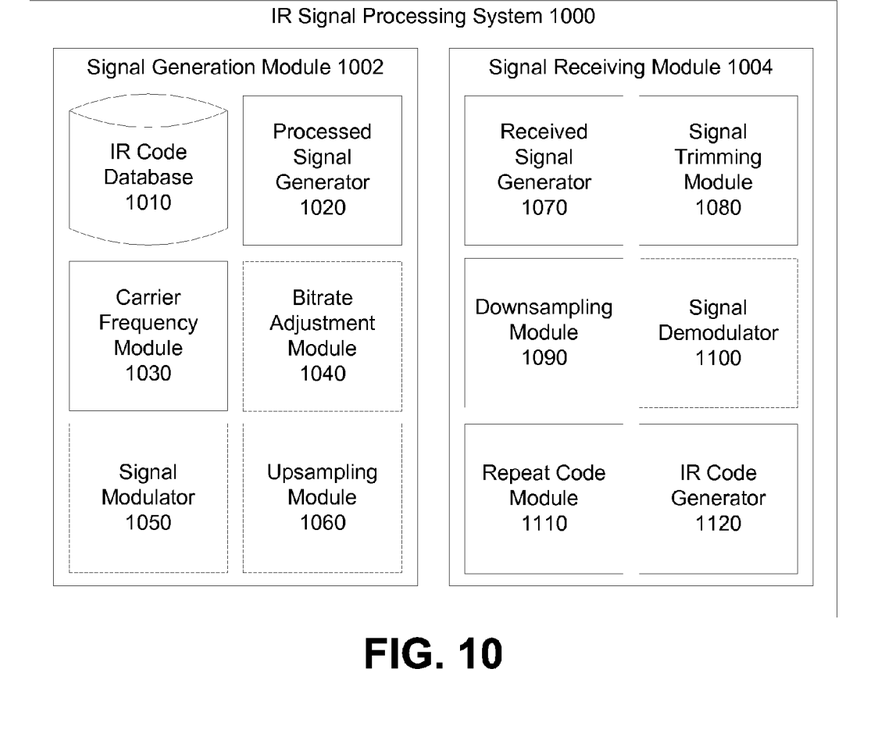
FIG. 10 illustrates a system capable of generating and receiving an infrared signal, according to one example embodiment.

FIG. 10 illustrates a system capable of generating and receiving an infrared signal, according to one example embodiment. The system is an IR signal processing system 1000 that is capable of performing processes and methods in this application. The IR signal processing system 1000 is comprised of one or more modules. Each module may be embodied as a hardware component, software code, or as a combination of both. The system 1000 may be embodied as software code in the IR processing layer 210, as hardware configured on a computing device 100, or as a server accessible by the computing device 100. The system may include additional, fewer, or different modules for various applications.

The first module, a signal generation module 1002, generates an infrared signal. The signal generation module 1002 includes an IR code database 1010, a processed signal generator 1020, a carrier frequency module 1030, and an upsampling module 1060. The signal generation module 1002 optionally includes a bitrate adjustment module 1040 and a signal modulator 1050. The IR code database 1010 is a database or memory that stores at least one infrared code in mark-space format.

The processed signal generator 1020 converts the IR code, embodied as a code in mark-space format, into a processed signal. The processed signal is a bitstream based on the IR code from the IR code database 1010.

The carrier frequency module 1030 is a module that receives a carrier waveform. The carrier waveform can be a pulse train at a specific carrier frequency. The carrier frequency module 1030 determines the carrier frequency of the carrier waveform based on an analysis of the carrier waveform. The analysis can be based on any conventional digital signal processing algorithm. In some cases, the carrier frequency module 1030 receives a value of a carrier frequency instead of the waveform itself.

In one example embodiment, the signal generation module 1002 includes a bitrate adjustment module 1040. The bitrate adjustment module 1040 adjusts the bus bitrate to the carrier frequency determined by the carrier frequency module 1030. By adjusting the bus bitrate, the bitrate adjustment module 1040 adjusts the rate at which the signal is output. The signal generation module 1002 may include the bitrate adjustment module 1040 if the bus bitrate can be set or adjusted. The bitrate adjustment module 1040 may further combine the processed signal with a pulse train at the carrier frequency to form an output signal.

In a second example embodiment, the signal generation module 1002 includes a signal modulator 1050. The signal modulator 1050 modulates the processed signal by appending a bit after each bit in the processed signal. Furthermore, the signal modulator 1050 doubles the bitrate of the processed signal. The signal generation module 1002 may include the signal modulator 1050 if the bitrate of the bus configured on the computing device cannot be set or adjusted. In other embodiments, the signal generation module 1002 may not include the signal modulator 1050 if the processed signal is not modulated 330 before the processed signal is output.

In some example embodiments, the signal generation module 1002 may include both the bitrate adjustment module 1040 and the signal modulator 1050. In other example embodiments, the signal generation module 1002 only includes one of the two modules.

The upsampling module 1060 upsamples the processed signal. The upsampling module 1060 determines a number of replicated bits to append to each bit in the processed signal. The number of bits is based on the difference between the carrier frequency and the operating frequency, or bitrate, of the bus connecting the processor 110 and the infrared system 150. The upsampling module 1060 also determines the value of the replicated bits. The replicated bits match the value of the bit the replicated bits are appended to. The upsampling module 1060 appends the appropriate replicated bits to each bit in the processed signal.

The signal receiving module 1004 processes infrared signals received by the computing device. The signal receiving module 1004 includes an intermediate signal generator 1070, a signal trimming module 1080, a downsampling module 1090, a repeat code module 1110, and an IR code generator 1120. The signal receiving module 1004 also optionally includes a signal demodulator 1100. The IR signal processing system 1000 may include both the signal generation module 1002 and the signal receiving module 1004, or just one of the two modules.

The intermediate signal generator 1070 generates an intermediate signal based on the received IR signal. The intermediate signal is a bitstream that the infrared signal is encoded on. The intermediate signal generator 1070 generates the intermediate signal at a sampling frequency of the infrared system 150.

The signal trimming module 1080 trims the intermediate signal to remove leading and trailing bits. The signal trimming module 1080 determines which bits in the intermediate signal are leading and trailing bits and subsequently removes the leading and trailing bits.

The downsampling module 1090 downsamples the intermediate signal. The downsampling module determines a downsampling factor for the intermediate signal. The downsampling factor is based on the sampling frequency received by the intermediate signal generator 1070 and, according to one embodiment, the carrier frequency associated with the carrier waveform received by the carrier frequency module 1030.

The signal receiving module 1004 optionally includes the signal demodulator 1100. In some embodiments, the intermediate signal is not demodulated, so the signal receiving module 1004 does not include the signal demodulator 1100. The signal demodulator 1100 replaces each instance of "10" in the intermediate signal with a logic 1. In one embodiment, the "10" is two consecutive bits—a logic 0 (or high) followed by a logic 0 (or low). Each instance of "00" is replaced with a 0. In one example, "00" is two consecutive logic low bits, and is replaced by single logic low.

The IR code generator 1120 converts the intermediate signal bitstream into an infrared code. The infrared code may be encoded in a mark-space format. The repeat code module 1110 separates repeat code segments from the infrared code. The repeat code module 1110 determines repeat code segments using a machine learning processor or a similar algorithm. The repeat code module 1110 may further store the repeat code in some example embodiments.

Additional Configuration Considerations

The disclosed example embodiments beneficially allow for sending and receiving signals on a mobile device. A conventional computing device 100 with infrared signal processing hardware may be able to send and receive infrared signals. However, additional hardware increases the cost of manufacturing mobile devices and increases power consumption within the mobile device. By using software to process sent and received infrared signals, the mobile device 100 may process infrared signals without additional hardware. Furthermore, upsampling the processed signal or adjusting the clock speed before sending the processed signal to the IR system 150 allows the IR system 150 to transmit the processed signal at the bus bitrate without compressing the signal in the time domain. Thus, the IR system 150 does not need to further modify or transform the processed signal before outputting an IR signal.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including a number of components, modules, or mechanisms, for example, as illustrated in FIGS. 1 and 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 110, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors 110 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors 110, not only residing within a single machine, but deployed across a number of machines. In some example embodiments, the one or more processors 110 or processor-implemented modules may be located in a single geographic location (e.g., within a home environment, an office environment, or a server farm). In other example embodiments, the one or more processors 110 or processor-implemented modules may be distributed across a number of geographic locations.

Some portions of this specification are presented in terms of algorithms or symbolic representations of operations on data stored as bits or binary digital signals within a machine memory (e.g., a computer memory 120). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories 120 (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating and receiving infrared signals on a mobile device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of receiving an infrared signal to generate an infrared code on a computing device, comprising:
    generating a clock signal on a data bus from a processor, the data bus connecting an infrared system to the processor configured on the computing device, the clock signal disconnected from the infrared system;
    receiving, at the infrared system, an infrared signal that is transmitted on data bus;
    generating, through the data bus, an intermediate signal on the processor by sampling the infrared signal at an operating frequency determined by the clock signal, the intermediate signal comprising a plurality of bits;
    receiving a waveform of the infrared signal;
    determining a carrier frequency of the infrared signal based on an analysis of the waveform; and
    generating the infrared code based on the intermediate signal and the carrier frequency.

2. The method of claim 1, further comprising:
    downsampling the intermediate signal in the time domain by a downsampling factor, the downsampling factor based on an operating frequency and the carrier frequency, the operating frequency based on the clock signal, wherein the carrier frequency is lower than the operating frequency; and
    demodulating the intermediate signal in the time domain.

3. The method of claim 2, wherein the downsampling factor is based on the difference between the carrier frequency and the operating frequency of the data bus.

4. The method of claim 2, wherein demodulating the intermediate signal comprises removing alternating logic bits in the intermediate signal, wherein each of the alternating bits is a logic 0.

5. The method of claim 1, wherein the data bus is an SPI bus.

6. The method of claim 1, wherein the data bus is an $I^2S$ bus.

7. A computer program product comprising a non-transitory computer readable storage medium configured to store instructions to generate an infrared code, the instructions when executed by a processor cause the processor to:
    generate a clock signal on a data bus from a processor, the data bus connecting an infrared system to the processor configured on a computing device, the clock signal disconnected from the infrared system;
    receive, at the infrared system, an infrared signal that is transmitted to the data bus;
    generate an intermediate signal by sampling the infrared signal at an operating frequency determined by the clock signal;
    receive a waveform of the infrared signal;
    determine a carrier frequency based on an analysis of the waveform; and
    generate an infrared code based on the intermediate signal.

8. The computer program product of claim 7, wherein the instructions further cause the processor to downsample the intermediate signal in the time domain.

9. The computer program product of claim 8, further comprising instructions that cause the processor to trim the intermediate signal by removing leading and trailing bits from the intermediate signal, the leading and trailing bits comprised of a continuous sequence of logic 0 bits.

10. The computer program product of claim 8, wherein the instructions that cause the processor to downsample the intermediate signal further comprise:
    determining a downsampling factor; and
    removing one or more bits from the intermediate signal based on the downsampling factor.

11. The computer program product of claim 10, wherein the downsampling factor is determined based on a difference between the carrier frequency and the operating frequency.

12. The computer program product of claim 8, further comprising instructions that cause the processor to:
    determine that the intermediate signal is a modulated signal; and
    demodulate, in response to the determination, the intermediate signal.

13. The computer program product of claim 12, wherein the instructions that cause the processor to demodulate the intermediate signal further comprises removing alternating bits in the intermediate signal, wherein each alternating bit is a 0.

14. The computer program product of claim 12, wherein the instructions that cause the processor to demodulate the intermediate signal further comprise:
    identifying, using statistical processing, a plurality of alternating bits in the intermediate signal; and
    removing the alternating bits in the intermediate signal.

15. The computer program product of claim 8, further comprising instructions that cause the processor to:
    determine that the infrared code includes repeat code segments, the repeat code segments comprising repeated instances of information encoded in the infrared signal; and
    remove the repeat code segments from the infrared code.

16. The computer program product of claim 7, wherein the data bus is a serial peripheral interface (SPI) bus.

17. The system of claim 16, wherein the processor is further configured to demodulate the intermediate signal.

18. The system of claim 17, wherein the processor is further configured to remove one or more leading and trailing logic bits from the intermediate signal.

19. The computer program product of claim 7, wherein the data bus is an $I^2S$ bus.

20. A system for receiving an infrared signal on a computing device comprising:
    a processor;
    an infrared communication module, the infrared communication module receiving an infrared signal; and
    a data bus connecting the infrared communication module to the processor, the data bus having an operating frequency based on a clock signal from the processor, the clock signal disconnected from the infrared communication module, the processor configured to:
        generate an intermediate signal by sampling the infrared signal received by the infrared communication module at the operating frequency of the data bus;
        receive a waveform of the infrared signal;
        determine a carrier frequency of the infrared signal based on an analysis of the waveform; and
        generate an infrared code in mark/space format based on the intermediate signal.

21. The system of claim 20, wherein the data bus is a serial peripheral interface (SPI) bus.

22. The system of claim 20, wherein the data bus is an $I^2S$ bus.

23. The system of claim 20, wherein the processor is further configured to downsample the intermediate signal in the time domain.

24. The system of claim 23, wherein downsampling further comprises determining a downsampling factor to downsample the intermediate signal by.

* * * * *